No. 12,843. REISSUED AUG. 11, 1908.

G. E. PERRY.

TIME STAMP.

APPLICATION FILED JULY 8, 1908.

2 SHEETS—SHEET 1.

Witnesses:

Ira D. Perry

Charles G. Cope

Inventor:

George Elliot Perry

By James, Addington & Ames

Att'ys.

No. 12,843. REISSUED AUG. 11, 1908.
G. E. PERRY.
TIME STAMP.
APPLICATION FILED JULY 8, 1908
2 SHEETS—SHEET 2.
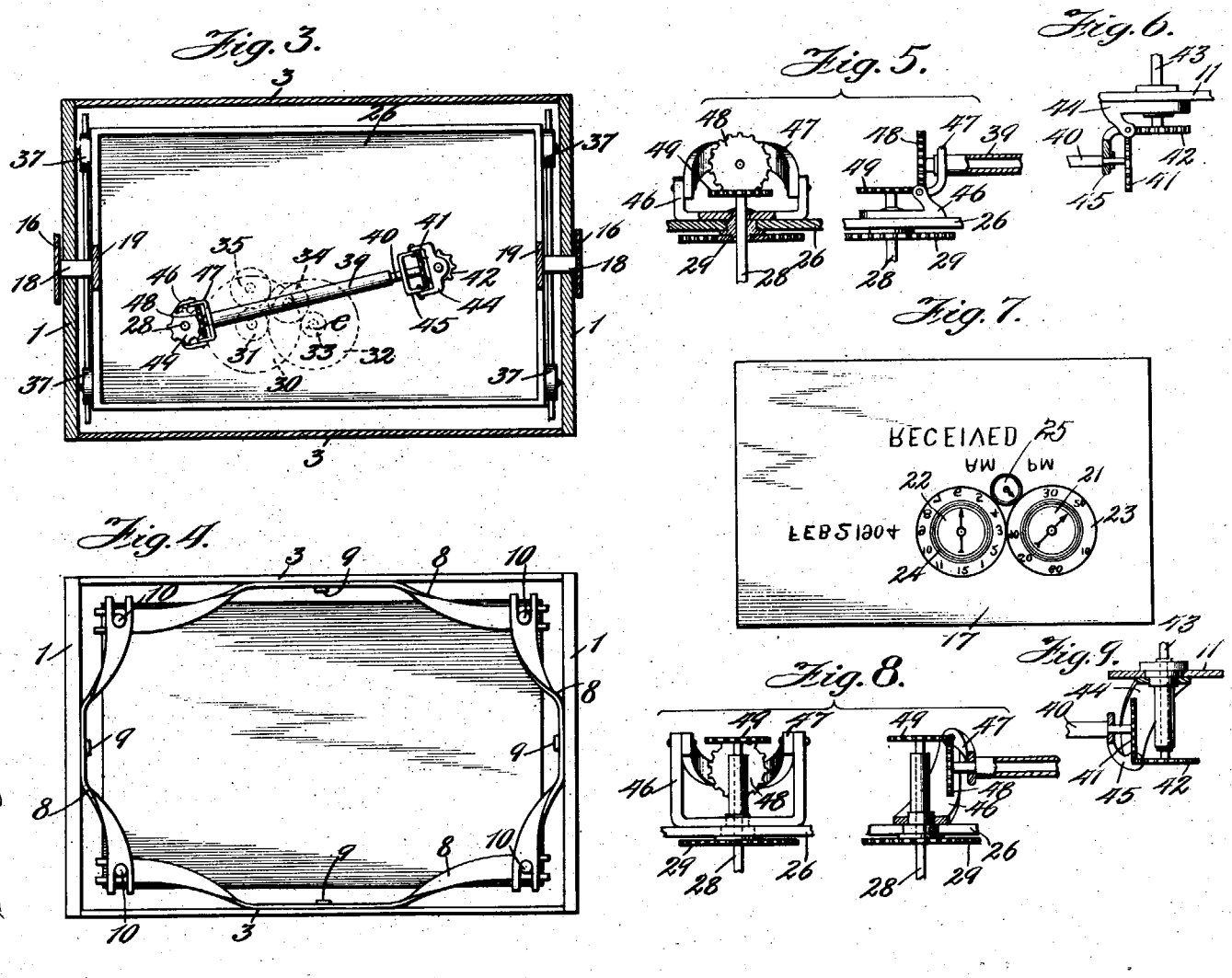
Witnesses:
Ira D. Perry
Charles E. Cooke
Inventor:
George Elliot Perry
By Jones, Geddings & Ames
Att'ys

UNITED STATES PATENT OFFICE.

GEORGE ELLIOT PERRY, OF CHICAGO, ILLINOIS, ASSIGNOR TO STROMBERG ELECTRIC MFG. CO., A CORPORATION OF ILLINOIS.

TIME-STAMP.

No. 12,843. Specification of Reissued Letters Patent. Reissued Aug. 11, 1908.

Original No. 885,676, dated April 21, 1908, Serial No. 256,915. Application for reissue filed July 8, 1908. Serial No. 442,630.

*To all whom it may concern:*

Be it known that I, GEORGE ELLIOT PERRY, a citizen of the United States, residing at Chicago, in the county of Cook and State of Illinois, have invented new and useful Improvements in Time-Stamps, of which the following is a full, clear, concise, and exact description, reference being had to the accompanying drawing, forming a part of this specification.

My invention relates to time stamps and has for its object, in a time stamp of the class described, the provision of novel means for continuously connecting the motor mechanism with the impression mechanism.

The other novel features of my invention will appear from the drawings filed herewith and from the following description thereof.

Figure 2:
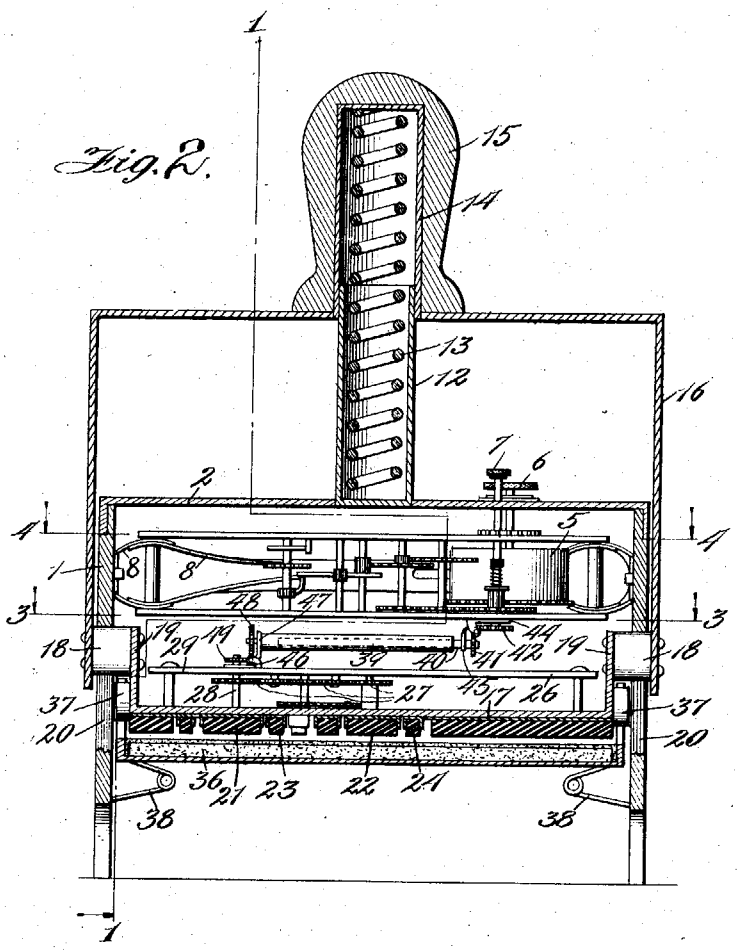
Figure 1:
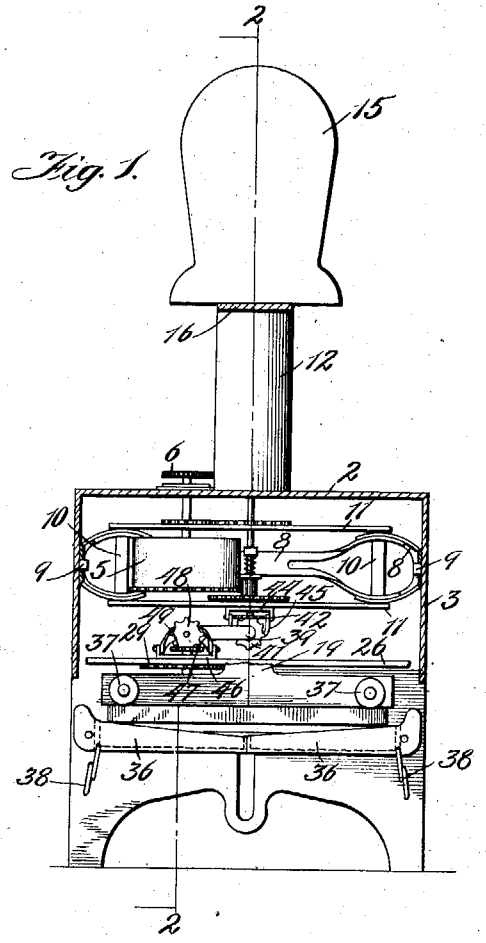

In the drawings Figure 1 is a sectional view of my invention, taken on the line 1—1 of Fig. 2; Fig. 2 is a sectional view taken on the line 2—2 of Fig. 1; Fig. 3 is a view on the line 3—3 of Fig. 2, showing a plan view of the splined shaft connection; Fig 4 is a view on the line 4—4 of Fig. 2, showing the resilient mounting for the motor; Figs. 5 and 6 are detail views of the hinged connection for the splined shaft; Fig. 7 is a face view of the time recording elements of the impression mechanism; and, Figs. 8 and 9 are detail views of a modification of the hinged connection for the splined shaft.

Referring to the drawings by reference characters, in which like reference numerals are used to designate like parts in the several figures, the time stamp is preferably supported upon legs 1, 1, said legs constituting gage parts for the stamp, adapted to engage the surface to be impressed and also closing the ends of the casing in which the mechanism of the stamp is contained. Suitably mounted upon the legs 1, 1, is a table 2, having extended side walls 3, 3, for inclosing and supporting the motor mechanism, as shown in Fig. 1.

The motor mechanism consists of any suitable clock train, having a main spring 5 and a winding stem 6, for winding the same. A setting stem 7 is also provided for manually moving the clock train in the usual manner. The motor mechanism is preferably resiliently mounted by means of springs 8, 8, said springs having a central aperture therein adapted to engage pins 9, 9, carried by the end plates 1, 1, and the extended portions 3 of the table 2, as shown in Fig. 4. The springs 8, 8, are preferably split at their ends, as shown in Figs. 1 and 2, the split members of said springs being slotted, and being adapted to engage pins 10, 10, said pins being riveted or otherwise secured to the supporting plates 11, 11, said pins and the plates 11, 11, constituting the frame within which the motor mechanism 4 is carried, as shown in Figs. 1 and 2.

It will be seen that after the ends of the springs 8, 8, have been placed in engagement with the pins 10, 10, said springs may be readily sprung into position upon the pins 9, 9, said springs forming a resilient mounting for the motor mechanism upon all sides thereof.

Secured to the table 2 is a tube 12, said tube inclosing a spiral spring 13, and being adapted to telescope with a suitable bushing 14 disposed within the handle 15, when the stamp is actuated to form an impression, as hereinafter described. The handle 15 is preferably mounted upon a yoke or bail 16, the extended ends of said yoke being suitably secured to a supporting plate 17. Blocks 18, 18, are disposed between the ends of the yoke 16, and the upturned ends 19 of the supporting plate 17, said blocks being adapted to reciprocate within slots 20, 20, formed in the end plates 1, 1, said slots and blocks being adapted to guide the impression mechanism when the same is moved to make an impression.

The impression mechanism preferably consists of revoluble dies 21 and 22, said dies carrying a pointer or hand and being adapted to indicate the time upon clock dials 23, and 24, said dials being stationarily mounted upon the supporting plate 17, as shown in Fig. 7. One of said dials is adapted to indicate the hour of the day and the other dial is adapted to indicate the minute of the hour, a small die 25 being provided for indicating the forenoon or afternoon of the day, as shown in Fig. 7. Any desirable information may be stationarily mounted upon the part of the plate 17 not occupied by the time recording mechanism, said stationarily mounted impression characters being disposed thereon so as to aline with the impression face of the time recording mechanism.

Mounted in any suitable manner, preferably above the supporting plate 17, is a sub-plate 26, a train of gears 27 being suitably mounted between the plates 17 and 26, for relatively moving the elements of the time recording mechanism. The train of gears for relatively moving the revoluble dies is shown in Fig. 3. Power is applied to an arbor 28, suitably journaled between the plates 17 and 26, by the horologic motor or clock mechanism 4, as will be hereinafter described.

Mounted upon the arbor 28 is a pinion 29, said arbor carrying upon one end thereof the revoluble die for printing the minutes of the hour. The pinion 29 is adapted to mesh with a large pinion 30, a small pinion 31 mounted upon the arbor with the pinion 30 is adapted to mesh with a large pinion 32. The arbor carrying the pinion 32, is also adapted to carry the revoluble die 22 for indicating the hour of the day. Mounted upon the arbor carrying the revoluble die for indicating the hour of the day, is a small pinion 33, said small pinion 33 being adapted to mesh with an idler 34, said idler meshing with a pinion 35, mounted upon the arbor which carries the small die 25 for indicating the forenoon and afternoon of the day.

It will be understood that any suitable arrangement of gears or other means may be provided for relatively moving the time recording mechanism, and other time recording mechanism may be adopted in lieu of the revoluble dies and the dials above described, without departing from the spirit of my invention.

The operative face of the impression mechanism is adapted to be inked by inking pads 36, 36, said pads being adapted to rest normally out of engagement with the face of the impression mechanism, so as not to interfere with the free movement of the revoluble dies when the stamp is in its normal position. The pads 36, 36 are suitably pivoted to the end plates, 1, 1, and are adapted to be carried out of the path of the impression mechanism by rollers 37, 37, carried by the supporting plate 17 when the same is actuated to make an impression, as shown in dotted lines in Fig. 1. Springs 38, 38 are adapted to return the inking pads 36, 36 to their normal positions after an impression has been made.

It will be seen that the impression mechanism is movable relative to the horologic motor mechanism to make an impression. In order to keep the revoluble elements of the impression mechanism in operative relation with the motor mechanism, when the impression mechanism is moved relative thereto, to make an impression, I provide a splined shaft, consisting of an outer casing or shaft 39, and an inner member 40, adapted to telescope therewith, as shown in Figs. 3, 5 and 6. The inner member 40 is preferably square in cross-section, and carries upon one end thereof a beveled pinion 41, adapted to mesh with a beveled pinion 42, carried upon an arbor 43 of the horologic motor 4. A plate or bracket 44 is secured to the plate 11, on which the motor mechanism is mounted, said plate or bracket 44 having arms, said arms being pivoted to the arms of a similar bracket 45, at a point opposite the point at which the beveled gears 41 and 42 mesh. The shaft 40, carrying the pinion 41, is journaled in the last mentioned plate or bracket 45, as shown in Fig. 6. It will be seen that the plates or brackets 44 and 45 may readily turn upon their pivot without interfering with the free movement of the beveled gears 41 and 42.

A similar bracket 46 is secured to the sub-plate 26 and is pivoted in like manner to a bracket or plate 47 in which is journaled the member 39 of the splined shaft, said member carrying upon the end thereof a beveled gear 48, adapted to mesh with a beveled gear 49, carried upon the arbor 28, to which is secured the pinion 29 of the train of gearing 27, adapted to relatively rotate the revoluble dies of the time recording mechanism.

In Figs. 8 and 9, I have illustrated another form of connection for the splined shaft, in which the driving pinion 43 of the horologic motor is extended sufficiently below the plate 11 to permit the beveled gear 41 to be mounted between the beveled gear 42, with which it is adapted to mesh, and said plate. The arbor 28, upon which is mounted the revoluble die for indicating the minutes of the hour, is also extended sufficiently above the sub-plate 26 in said modification, to permit the beveled gear 48 to be pivoted between the beveled gear 49, with which it is adapted to mesh and said sub-plate, the arms of the brackets or plates 44 and 46 being extended to permit the beveled gears 41 and 42, and 48 and 49, to rotate freely when said plates are moved upon their pivots.

The operation of my invention is as follows: When power is applied to the handle 15, the supporting plate 17 is depressed by means of the yoke 16, upon which said handle is mounted, said plate carrying the impression mechanism into contact with the surface to be impressed, the impression mechanism first coming in contact with the inking pads 36, 36, which, after inking the impression mechanism, are carried out of the path thereof, by the rollers 37, 37, carried by the plate 17. The handle 15 is depressed against the power of the coiled spring 13, said spring restoring the stamp to its normal position after an impression has been made. As the impression mechanism and the sub-plate 26 are moved relatively to the horologic motor mechanism, and the plate 11, as above described, the plates or brackets 45 and 47, in which are journaled the beveled gears 41 and 48, move upon their respective pivots, as above described, and the member 40 is partially withdrawn from the inclosing member 39, of the splined shaft, thus retaining the movable parts of the impression mechanism in operative relation with the motor mechanism, while an impression is being made, said time driven parts of the impression mechanism being adapted to be driven by the horologic motor through the members 40 and 39 of the splined shaft and the beveled gears 41 and 42, and 48 and 49.

I am aware that many changes may be made in the details of construction and the arrangement of the parts of my invention, without in any way departing from the spirit thereof, and I claim the right to make all such changes as fairly fall within the spirit of my invention.

Having described my invention what I claim as new and desire to secure by Letters Patent, is:

1. In a time stamp, the combination with a frame having gage parts adapted to engage the surface to be impressed and adjust the impression mechanism relatively thereto, of an impression mechanism having moving time controlled parts, a horologic motor for driving said parts mounted wholly on said frame, said impression mechanism being movable relatively to said motor mechanism to make an impression, and a plurality of shafts, one of said shafts being operatively connected to said motor mechanism and another of said shafts being operatively connected to the time driven elements of said impression mechanism, said shafts constituting a continuous connection between said motor mechanism and said impression mechanism, and being adapted to occupy a substantially horizontal position when the stamp is in its normal position and adapted to move toward a vertical position when an impression is made, whereby shafts of the required length may be used without increasing the height of the stamp.

2. In a time stamp, the combination with impression mechanism, having moving time controlled parts, of a horologic motor for driving said parts, said impression mechanism being movable relatively to said motor mechanism to make an impression, and a plurality of shafts, one of said shafts being operatively pivoted or hinged to said motor mechanism and another of said shafts being operatively pivoted or hinged to the time driven elements of said impression mechanism, said shafts constituting a continuous connection between said motor mechanism and the time driven elements of said impression mechanism, and being adapted to slidingly engage each other when the impression mechanism is moved to make an impression.

3. In a time stamp, the combination with a frame having gage parts adapted to engage the surface to be impressed and adjust the impression mechanism relatively thereto, of a horologic motor carried wholly by said frame, an impression mechanism operated by said motor and moved away from said motor in making an impression, and a motion transmitting device continuously connecting said motor and impression mechanism and arranged to occupy a substantially horizontal position when under normal conditions to reduce the space between said motor and impression mechanism to the minimum and move toward a vertical position when the impression mechanism is moved to make an impression.

4. In a time stamp, the combination with a frame having gage parts adapted to engage the surface to be impressed and adjust the impression mechanism relatively thereto, of a horologic motor carried wholly by said frame, an impression mechanism operated by said motor and movable relatively thereto in making an impression, a shaft continuously connecting said motor and impression mechanism and arranged to occupy a substantially horizontal position under normal conditions to reduce the space between said motor and impression mechanism to the minimum and adapted to move toward a vertical position when the impression mechanism is moved to make an impression.

5. In a time stamp, the combination with a frame having gage parts adapted to engage the surface to be impressed and adjust the impression mechanism relatively thereto, of a horologic motor carried wholly by said frame, an impression mechanism operated by said motor and movable relatively thereto in making an impression, a splined shaft continuously connecting said motor and impression mechanism and arranged to occupy a substantially horizontal position under normal conditions to reduce the space between said motor and impression mechanism to the minimum and adapted to move toward a vertical position when the impression mechanism is moved to make an impression.

6. In a time stamp, the combination with a frame having gage parts adapted to engage the surface to be impressed and adjust the impression mechanism relatively thereto, of a horologic motor carried wholly by said frame, an impression mechanism operated by said motor and movable relatively thereto in making an impression, an extensible shaft continuously connecting said motor and impression mechanism and arranged to occupy a substantially horizontal position under normal conditions to reduce the space between said motor and impression mechanism to the minimum and adapted to move toward a vertical position when the impression mechanism is moved to make an impression.

7. In a time stamp, the combination with impression mechanism having moving time controlled parts, of a horologic motor for driving said parts, a resilient mounting for said motor adapted to relieve the impact or jar upon the motor mechanism when an impression is made, said impression mechanism being movable relatively to said motor mechanism to make an impression, and a plurality of shafts, one of said shafts being operatively connected to said motor mechanism and another of said shafts being operatively connected to the time driven elements of said impression mechanism, said shafts constituting a continuous connection between said motor mechanism and said impression mechanism, and being adapted to occupy a substantially horizontal position when the stamp is in its normal position and adapted to move toward a vertical position when an impression is made, whereby shafts of the required length may be used without increasing the height of the stamp.

8. In a time stamp, the combination with impression mechanism having moving time controlled parts, of a horologic motor for driving said parts, springs associated with said motor mechanism, said springs constituting a resilient mounting therefor, said impression mechanism being movable relatively to said motor mechanism to make an impression, and a plurality of shafts, one of said shafts being operatively pivoted or hinged to said motor mechanism and another of said shafts being operatively pivoted or hinged to the time driven elements of said impression mechanism, said shafts constituting a continuous connection between said motor mechanism and the time driven elements of said impression mechanism, and being adapted to slidingly engage each other when the impression mechanism is moved to make an impression.

9. In a time stamp, the combination with impression mechanism having moving time controlled parts, of a horologic motor for driving said parts, said impression mechanism being movable relatively to said motor mechanism to make an impression, and a plurality of shafts, one of said shafts being operatively connected to said motor mechanism and another of said shafts being operatively connected to the time driven elements of said impression mechanism, said shafts constituting a continuous connection between said motor mechanism and said impression mechanism, and being adapted to occupy a substantially horizontal position when the stamp is in its normal position and adapted to move toward a vertical position when an impression is made, whereby shafts of the required length may be used without increasing the height of the stamp, and means for inking the face of the impression mechanism.

10. In a time stamp, the combination with impression mechanism having moving time controlled parts, of a horologic motor for driving said parts, said impression mechanism being movable relatively to said motor mechanism to make an impression, and a plurality of shafts, one of said shafts being operatively pivoted or hinged to said motor mechanism and another of said shafts being operatively pivoted or hinged to the time driven elements of said impression mechanism, said shafts constituting a continuous connection between said motor mechanism and the time driven elements of said impression mechanism, and being adapted to slidingly engage each other when the impression mechanism is moved to make an impression, and an inking pad adapted to ink the face of the impression mechanism.

In witness whereof, I have hereunto subscribed my name in the presence of two witnesses.

GEORGE ELLIOT PERRY.

Witnesses:
CHARLES G. COPE,
M. L. FARRAR.